(12) United States Patent
Osaki

(10) Patent No.: US 6,339,597 B1
(45) Date of Patent: Jan. 15, 2002

(54) AAL5 JITTER REDUCTION METHOD AND APPARATUS

(75) Inventor: Bunri Osaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/120,112

(22) Filed: Jul. 22, 1998

(30) Foreign Application Priority Data

Jul. 22, 1997 (JP) ............................................. 7-210192

(51) Int. Cl.[7] .............................................. H04L 12/28
(52) U.S. Cl. .................. 370/395; 370/395.62; 370/516; 370/395.65
(58) Field of Search ........................... 370/395.1, 395.6, 370/395.62, 395.65, 695.64, 503, 509, 511, 512-4, 516-519

(56) References Cited

U.S. PATENT DOCUMENTS

| | | |
|---|---|---|
| 5,260,978 A | 11/1993 | Fleischer et al. |
| 5,270,813 A | 12/1993 | Puri et al. |
| 5,652,749 A * | 7/1997 | Davenport et al. .......... 370/466 |
| 5,828,414 A * | 10/1998 | Perkins et al. .............. 348/423 |
| 6,101,196 A * | 8/2000 | Murakami ................... 370/516 |
| 6,111,878 A * | 8/2000 | Powell ........................ 370/395 |

FOREIGN PATENT DOCUMENTS

| | | |
|---|---|---|
| JP | 5-14399 | 1/1993 |
| JP | 6-62043 | 3/1994 |
| JP | 6-197119 | 7/1994 |
| JP | 7-66814 | 3/1995 |
| JP | 8-18576 | 1/1996 |
| JP | 8-97837 | 4/1996 |
| JP | 8-205103 | 8/1996 |
| JP | 9-261241 | 10/1997 |

* cited by examiner

*Primary Examiner*—David R. Vincent
(74) *Attorney, Agent, or Firm*—McGinn & Gibb, PLLC (57) ABSTRACT

In an AAL5 jitter reduction method for an image data transmission system for converting MPEG data into ATM cells and transmitting the ATM cells through an ATM line, an addition average value of system time clocks at timings for detecting starts of adjacent transport packets after AAL5 termination is obtained. A transport packet arrival time is corrected on the basis of the obtained addition average value. An AAL5 jitter reduction apparatus is also disclosed.

11 Claims, 6 Drawing Sheets

F I G. 1 A  ENCODER OUTPUT 101

F I G. 1 B  OUTPUT TO ATM NETWORK 102

F I G. 1 C  OUTPUT AT AAL5 TERMINATION

F I G. 1 D  CORRECTED DATA 104

FIG. 6A ENCODER OUTPUT PRIOR ART

FIG. 6B OUTPUT AT AAL 5 TERMINATION PRIOR ART

FIG. 6C CORRECTED DATA PRIOR ART

AAL5 JITTER REDUCTION METHOD AND APPARATUS

BACKGROUND OF THE INVENTION present invention relates to a transmission system for transmitting MPEG (Moving Picture image coding Experts Group) data through an ATM (Asynchronous Transfer Mode) line and, more particularly, to an AAL5 (ATM Adaptation Layer type 5) jitter reduction method and apparatus for reducing packing jitter of an AAL5 and jitter in a regeneration data rate and system time clock.

In a conventional transmission system for transmitting MPEG data through an ATM line, the phase-locked loop (PLL) technique is used to reduce AAL5 reception jitter.

Figure 5:
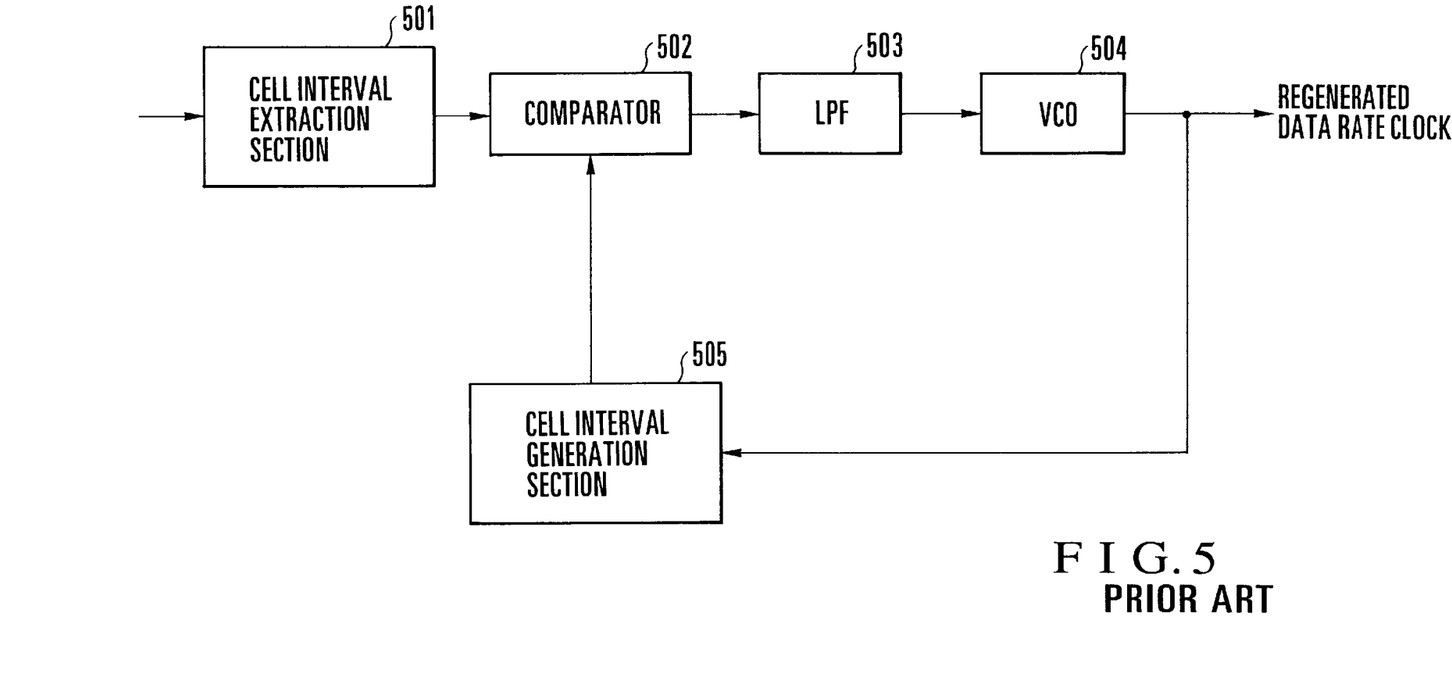
FIG. 5 is a block diagram of a conventional jitter reduction apparatus for regenerating an input data rate.

FIG. 5 shows an ATM line signal processing apparatus disclosed in, e.g., Japanese Patent Laid-Open No. 8-205103. Referring to FIG. 5, a cell interval extraction section 501 extracts the ATM cell interval from received input data. A cell interval generation section 505 generates a reference ATM cell interval using the clock of the regeneration data rate regenerated by a voltage-controlled oscillator (VCO) 504. A comparator 502 compares the two ATM cell intervals to output the cell interval error. A low-pass filter (LPF) 503 smoothes the cell interval error from the comparator 502 and controls the output clock interval of the VCO 504 using the error smoothing signal, thereby making the output from the comparator 502 zero.

Figure 6A:
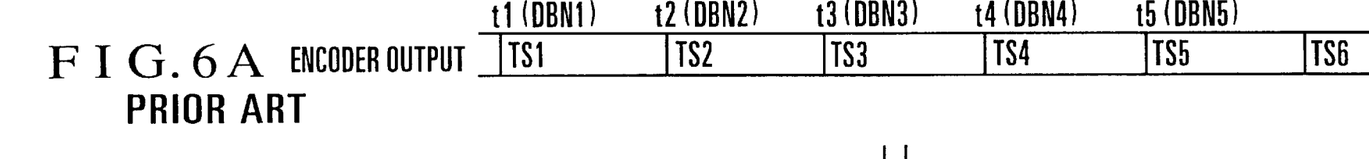
FIGS. 6A to 6C are timing charts showing an MPEG system clock regeneration operation by the conventional method.
Figure 6B:
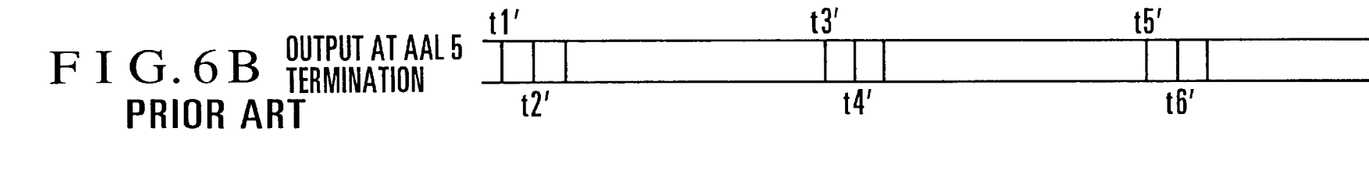
Figure 6C:
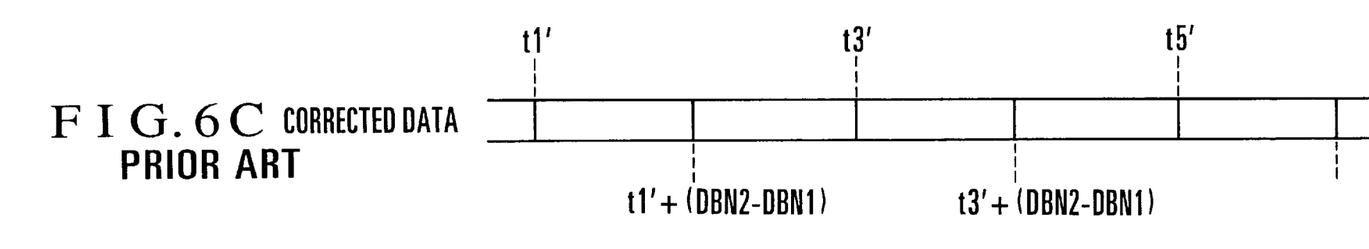

FIGS. 6A to 6C show a packet reception operation disclosed in Japanese Patent Laid-Open No. 8-97837. This prior art uses the "IEEE 1394" frame format. FIG. 6A shows the encoder output on the transmission side. FIG. 6B shows the AAL5 terminal output on the reception side. FIG. 6C shows corrected data.

In this scheme, the position of a transport packet can be properly grasped from a sync time representing the start of a frame and a data block number capable of specifying the start of the packet, as shown in FIG. 6C. On the basis of this information, a program clock reference (PCR) as information associated with the system time clock output by counting system clocks on the decoder side, which are transmitted from the encoder side, is corrected to reduce the system clock jitter on the decoder side.

Figure 4A:
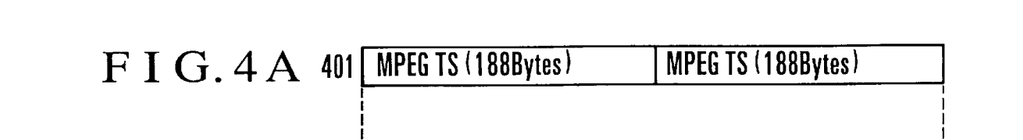
FIGS. 4A to 4D are timing charts showing a data conversion operation of converting MPEG data into ATM cells.
Figure 4B:
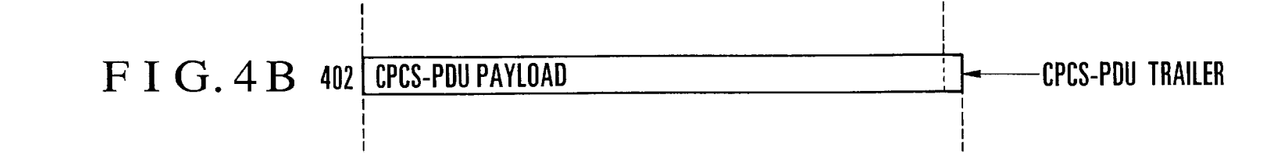
Figure 4C:
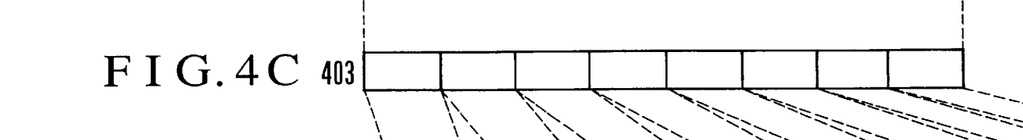
Figure 4D:
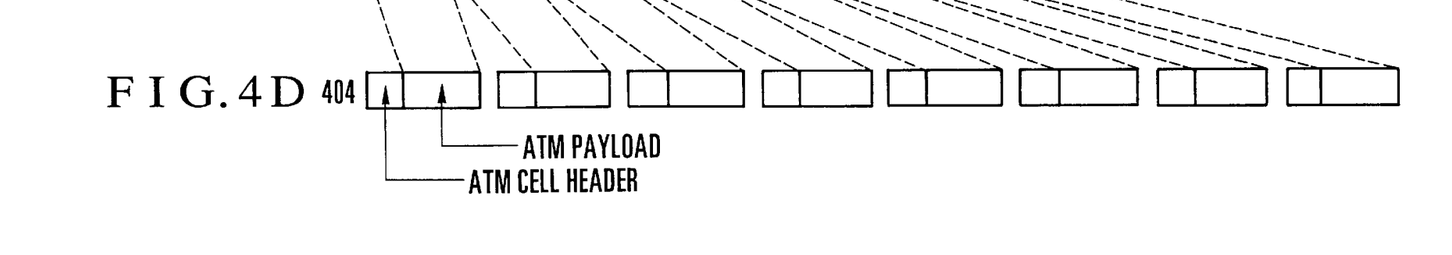

In an "MPEG over ATM" (transmission system) which has been examined in the ATM Forum, an AAL5 is constituted by two MPEG transport stream packets. FIGS. 4A to 4D show the AAL5 frame format. As shown in FIG. 4B, a CPCS-PDU payload is constituted by two 188-byte MPEG transport packets 401. An 8-byte trailer is added to generate AAL5 data 402. As shown in FIG. 4C, the data 402 is divided into 48-byte data 403. An ATM cell header is added to each 48-byte data, thereby generating an ATM cell 404 to be transmitted, as shown in FIG. 4D.

In the standard data transmission system based on "MPEG and ATM", the reception apparatus receives an AAL5 data unit and then constructs the two MPEG transport packets. The two MPEG data are time-compressed and output as burst data. For this reason, jitter is generated depending on whether the transport packet is arranged before or after the AAL5. This jitter is called packing jitter.

Conventionally, when fixed rate transmission is to be performed using the ATM line, the PLL is used to regenerate the input data rate on the reception side, as shown in FIG. 5, and additionally, a buffer is used to obtain fixed rate data. However, in MPEG regeneration, the frequency of the system clock of the decoder is 27 MHz which is asynchronous with the input data rate. For this reason, a PLL and a buffer are further required. That is, the apparatus has two PLLs and two buffers, resulting in a redundant arrangement.

If the input data rate need not be regenerated, the MPEG data can be decoded by directly regenerating the system clock at 27 MHz. However, when the system clock is regenerated while keeping the AAL5 packing jitter included, this jitter may be superposed on the system time clock.

When a scheme as shown in FIGS. 6A to 6C is to be applied to the ATM as a method of reducing the packing jitter, a sync time representing the start of a frame, i.e., an AAL5 and a data block number representing the start of a transport packet are necessary. However, these pieces of information cannot be transmitted by "MPEG over ATM".

SUMMARY OF THE INVENTION

It is an object of the present invention to provide an AAL5 jitter reduction method and apparatus for, when MPEG data is transmitted through an ATM line, reducing the AAL5 packing jitter on the reception side.

It is another object of the present invention to provide an AAL5 jitter reduction method and apparatus for, when MPEG data is transmitted through an ATM line, reducing jitter on the reception side without using any PLL and buffer to regenerate an input data rate at a predetermined rate.

It is still another object of the present invention to provide an AAL5 jitter reduction method and apparatus for, when MPEG data is transmitted through an ATM line, regenerating a system time clock having excellent jitter characteristics on the reception side.

In order to achieve the above objects, according to the present invention, there is provided an AAL5 jitter reduction method for an image data transmission system for converting MPEG data into ATM cells and transmitting the ATM cells through an ATM line, comprising the steps of obtaining an addition average value of system time clocks at timings for detecting starts of adjacent transport packets after AAL5 termination, and correcting a transport packet arrival time on the basis of the obtained addition average value.

DESCRIPTION OF THE PREFERRED EMBODIMENTS

FIG. 1 explains the principle of data conversion from the transmission side to the reception side in the present invention.

Figure 1A:
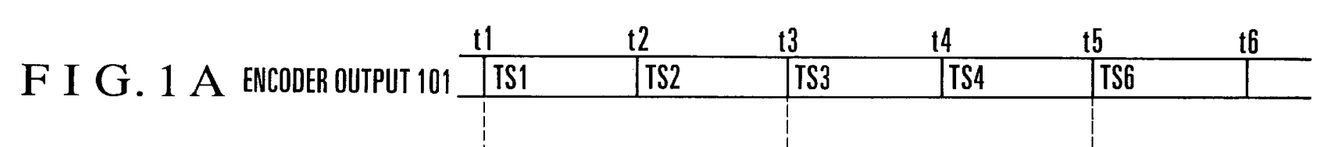
FIGS. 1A to 1D are timing charts showing the principle of data conversion from the transmission side to the reception side in the present invention.
Figure 1B:
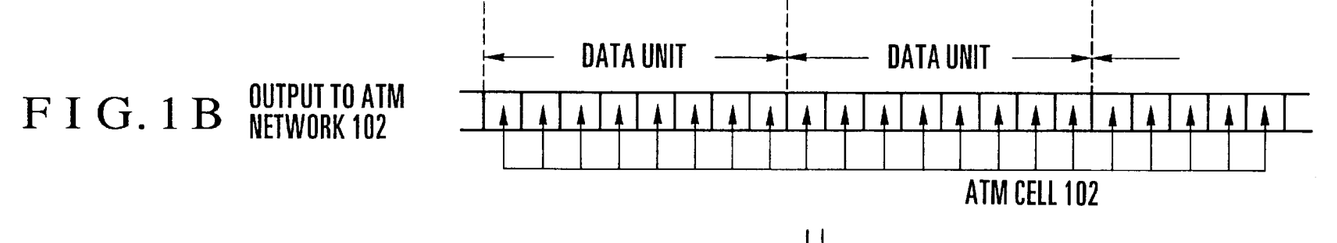

An encoder constituting a transmission apparatus generates an MPEG transport packet as data 101 having a fixed bit rate, as shown in FIG. 1A. This encoder output 101 is converted into a plurality of ATM cells 102 and sent to an ATM network, as shown in FIG. 1B. More specifically, as described above with reference to FIGS. 4A to 4D, two transport packets are put into one data unit, and a trailer is added to it to form a CPCS-PDU. Then, one data unit is converted into eight ATM cells 102.

Figure 1C:
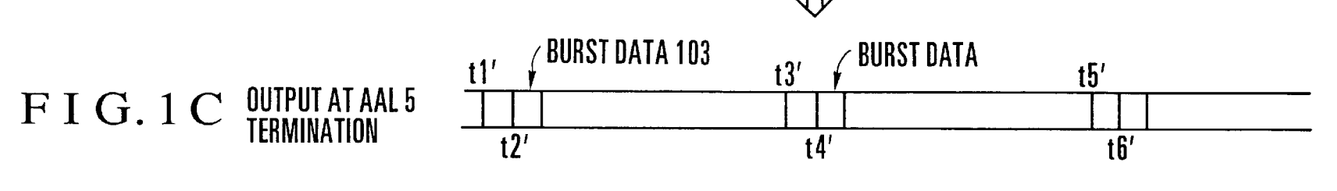

A decoder constituting a reception apparatus receives the data up to the trailer to terminate the AAL5, and at this time point, constructs burst data 103 (t1', t2'), (t3', t4'), (t5', t6'), . . . each time-compressed in units of two transport packets and output the burst data 103, as shown in FIG. 1C.

Figure 1D:
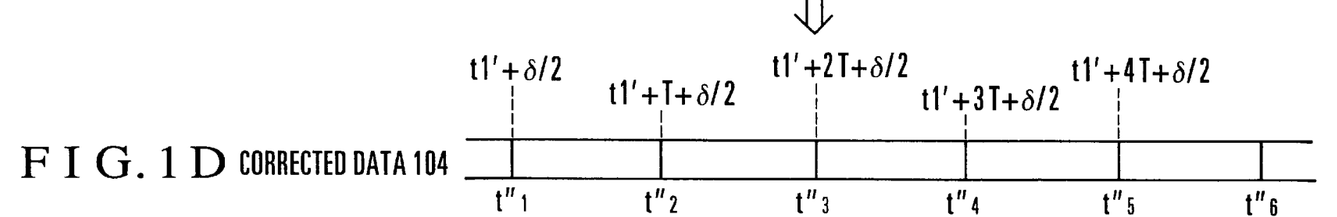

To obtain the fixed bit rate from the burst data 103, the arrival time of the latter-half packet of the burst data is shifted to the intermediate point (t1", t2", t3", . . . ) between the arrival time and that of the next burst data, thereby generating corrected data 104, as shown in FIG. 1D.

The arrival time shift for time correction which is performed to convert the burst data 103 into the fixed bit rate and properly regenerate the input data rate will be described in more detail.

Let t1 be the generation time of a transport packet TS1 on the encoder side, and t2 be the generation time of a transport packet TS2. Transport packets TS3 to TS6 are generated at times t3 to t6 (FIG. 1A). On the other hand, the packet arrival times at the AAL5 terminal are t1', t2', . . . Since the transport packets TS1 and TS2 are packed into the same AAL5, the transport packets TS1 and TS2 are converted into the burst data 103 (FIG. 1C).

When the time difference between the two transport packets constituting each burst data 103 (the length of one compressed transport packet) is represented by a very short time δ, the following relationship holds:

$$t2'=t1'+\delta$$

where δ is a value unique to the apparatus. Similarly, the following relationship holds:

$$t4'=t3'+\delta$$

Letting T be the interval between the transport packet data 101 on the encoder side, t3' and t1' has the following relationship:

$$t3'=t1'+2T$$

The arrival time t1" after shift is given by:

$$t1'' = (t1' + t2')/2$$
$$= \{t1' + (t1' + \delta)\}/2$$
$$= t1' + \delta/2$$

Similarly, t2" and t3" are given by:

$$t2'' = (t2' + t3')/2$$
$$= \{(t1' + \delta) + (t1' + 2T)\}/2$$
$$= t1' + T + \delta/2$$
$$t3'' = (t3' + t4')/2$$
$$= \{t3' + (t3' + \delta)\}/2$$
$$= t3' + \delta/2$$
$$= t1' + 2T + \delta/2$$

respectively (FIG. 1D). This also applies to the remaining transport packets, and the input data rate can be properly regenerated.

Figure 2:
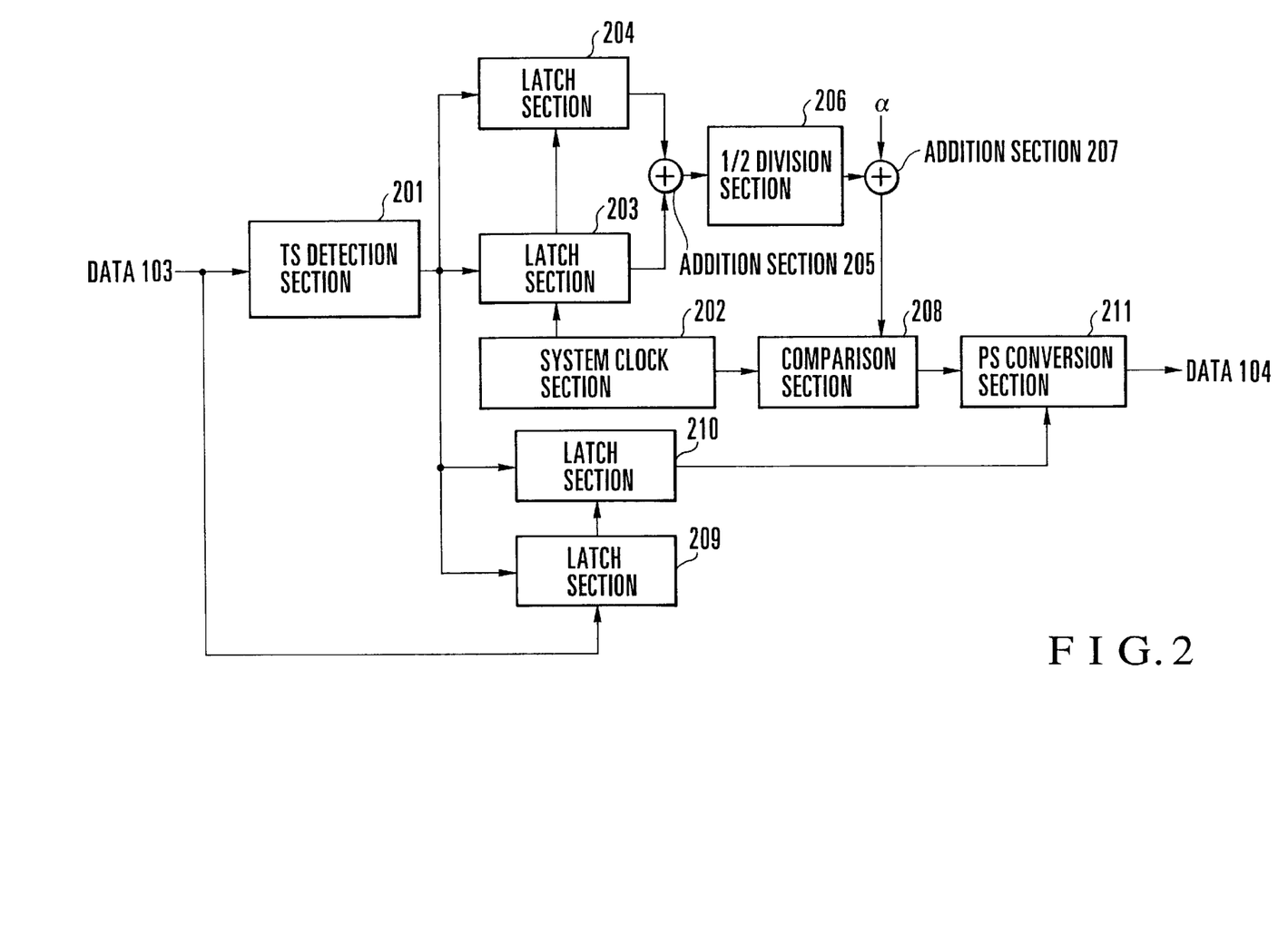
FIG. 2 is a block diagram of a jitter reduction apparatus according to the first embodiment of the present invention, which regenerates an input data rate.

FIG. 2 shows a jitter reduction apparatus according to an embodiment of the present invention. In this embodiment, regeneration of the input data rate will be described.

The jitter reduction apparatus shown in FIG. 2 has an input data rate output system which receives the burst data 103 after the AAL5 termination and outputs timing-adjusted serial data from a PS conversion section 211 through two latch sections 209 and 210 connected to each other. The jitter reduction apparatus also has a system clock section 202 for always outputting a system time clock as time information (time data) output by counting the system clock (27 MHz) on the decoder side.

The apparatus also has an addition section 205, a ½ division section 206, an addition section 207, and a comparison section 208, which sequentially latch the system time clocks of transport packets of the input data 103 to two latch sections 203 and 204 connected to each other, calculate the outputs from the latch sections, shift the input transport packet arrival time to convert the input data 103 into a fixed bit rate, and adjust the operation timing of the PS conversion section 211.

Reference numeral 201 denotes a TS detection section for controlling the latch timings of the latch sections 203, 204, 209, and 210.

The operation of the jitter reduction apparatus having the above arrangement will be described next.

The TS detection section 201 detects the start of the transport packet of the input data 103 and outputs a trigger signal, thereby controlling the signal holding operations of the latch sections 203, 204, 209, and 210. The latch sections 203 and 204 sequentially shift and hold the system time clocks output from the system clock section 202 of the MPEG decoder in accordance with the timing of the trigger signal from the TS detection section 201.

Simultaneously, the latch sections 209 and 210 sequentially shift and hold the input data 103 in accordance with the timing of the trigger signal from the TS detection section 201. Therefore, the latch sections 203 and 204 sequentially hold the adjacent transport packet detection timings while the latch sections 209 and 210 hold the data 103 of the transport packets, respectively.

The addition section 205 adds the system time clocks held by the latch sections 203 and 204 and outputs the system time clock. The division section 206 divides the sum output from the addition section 205 by 2 to output the intermediate timing of the adjacent transport packets as time information. The addition section 207 adds a predetermined value α to the output from the division section 206 and outputs the sum.

The comparison section 208 compares the output from the addition section 207 with the system time clock from the system clock section 202 and outputs a trigger signal at a timing when the two outputs match. At this time, to match the current time, a time delay amount must be given to the time information of the intermediate timing output from the ½ division section 206. For this purpose, the addition section 207 adds the predetermined value α.

More specifically, when the value (addition average value) obtained by shifting the arrival time as the output from the ½ division section 206 is compared with the system time clock output from the system clock section 202, the system time clock is compared with the past time. To use the current time as a reference, the predetermined value α is added to the output from the division section 206. As the predetermined value α, for an even data time t2n" from the start position of the corrected data, a value of (T−δ/2) or more must be used, and for an odd data time t2n−1", a value of δ/2 or more must be used. Practically, T−δ/2 is preferable.

The PS conversion section 211 converts the parallel data held by the latch section 210 into serial data in accordance with the trigger signal output when the comparison section 208 detects coincidence, and outputs the serial data as the corrected data 104.

In the circuit shown in FIG. 2, the latch sections 203 and 204, the addition section 205, and the division section 206 correspond to the basic arrangement of this embodiment, which calculates the information for shifting the transport packet arrival time.

Figure 3:
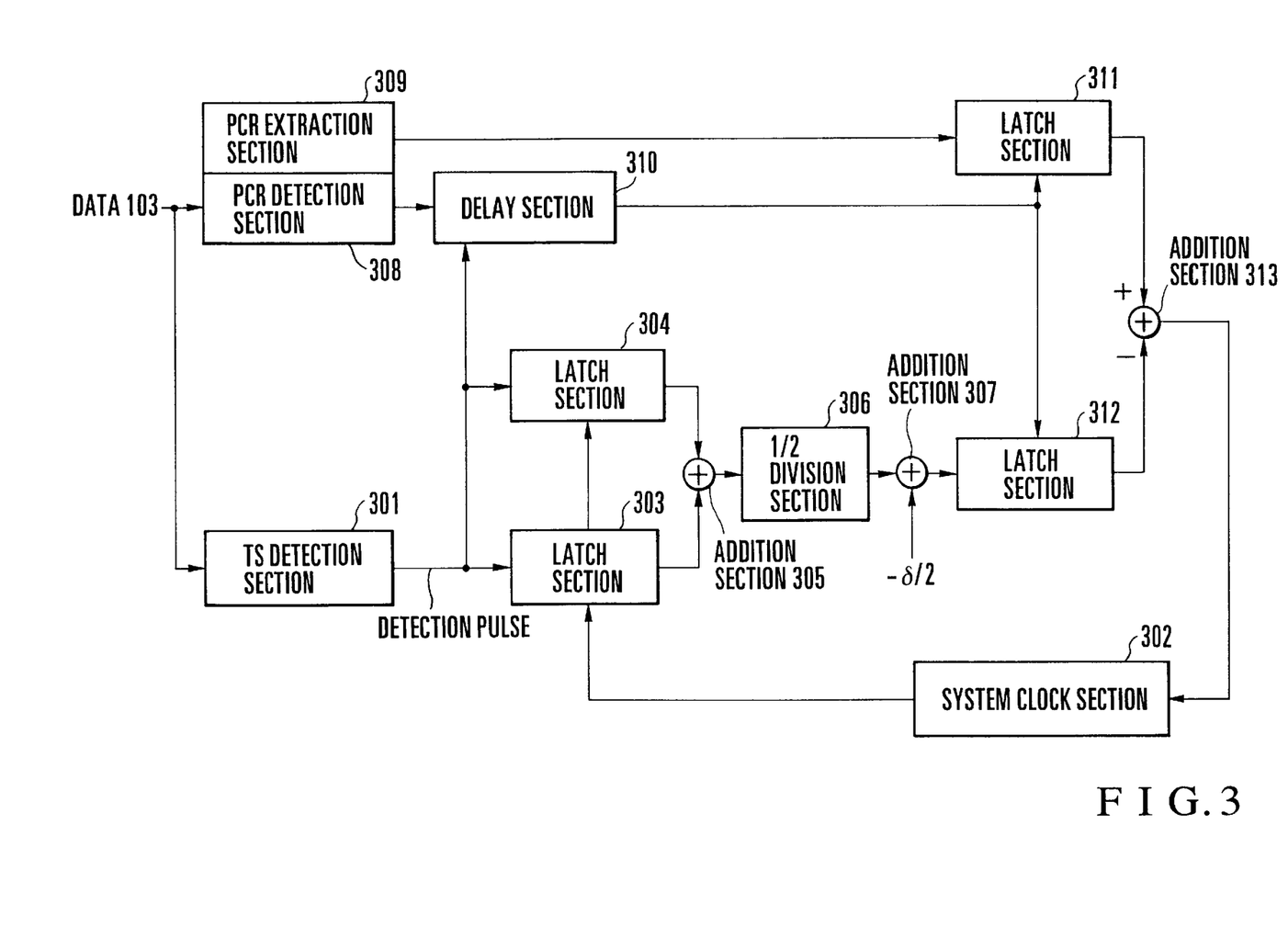
FIG. 3 is a block diagram of a jitter reduction apparatus according to the second embodiment of the present invention, which regenerates an MPEG system clock.

FIG. 3 shows a jitter reduction apparatus according to the second embodiment of the present invention. In this embodiment, the input data rate is not regenerated, and instead, the system clock on the MPEG reception side is directly regenerated.

The jitter reduction apparatus of this embodiment receives data 103 after the AAL5 termination shown in FIG. 1C. Latch sections 303 and 304, an addition section 305, and a ½ division section 306 constitute a portion for calculating information for shifting the transport packet arrival time and have the same arrangement as that constituted by the blocks 203 to 206 in the first embodiment.

The apparatus has a system clock section 302 for counting the system clock (27 MHz) on the decoder side and always outputting time information (system time clock). The system time clocks from the system clock section 302 are sequentially held by the two latch sections 303 and 304 in units of transport packets of the input data 103. The addition section 305 and the division section 306 calculate the outputs from the latch sections 303 and 304 and output time information for correcting the transport packet arrival time on the basis of the addition average value as the calculation result.

The apparatus also has a PCR detection section 308 and a PCR extraction section 309 for detecting/extracting a PCR having information as a time reference (time base) for decoding/regenerating data of a video/audio program inserted in the transport packet. To regenerate the system clock, the arrival time of the PCR is required. Therefore, an addition section 307 adds −δ/2. The output from the addition section 307 and the output from the PCR extraction section 309 are latched by latch sections 311 and 312 and then differentially added by an addition section 313. The frequency of the system clock in the system clock section 302 is controlled in accordance with the output from the addition section 313.

The operation of the jitter reduction apparatus having the above arrangement will be described next.

A TS detection section 301 detects the start of the transport packet of the input data 103 and outputs a trigger signal, thereby controlling the holding operations of the latch sections 303 and 304. The latch sections 303 and 304 sequentially shift and hold the system time clock outputs from the system clock section 302 of the MPEG decoder in accordance with the timing of the trigger signal from the TS detection section 301. Therefore, the latch sections 303 and 304 sequentially hold the adjacent transport packet detection timings.

The addition section 305 adds the system time clocks held by the latch sections 303 and 304 and outputs the system time clock. The division section 306 divides the addition output from the addition section 305 by 2 to output the intermediate timing of the adjacent transport packets as time information. The addition section 307 adds −δ/2 to the output from the division section 306 and outputs the sum.

The PCR detection section 308 detects the PCR value having information as the time reference (time base) from the transport packet of the input data 103 and outputs a detection pulse. The PCR extraction section 309 extracts the PCR value when the PCR is detected, and outputs the extracted value.

A delay section 310 delays the PCR detection pulse from the PCR detection section 308 until arrival of the next transport packet and triggers the latch sections 311 and 312. The latch section 311 holds the PCR extracted by the PCR extraction section 309 in accordance with the trigger signal from the delay section 310. Simultaneously, the latch section 312 holds the system time clock output from the system clock section 302 at the time shifted from the arrival time of the transport packet.

The addition section 313 generates the difference value between the data held by the latch sections 311 and 312 to control the frequency of the system clock in the system clock section 302. As a result, the frequency of the system clock is fed back such that the difference value between the outputs from the latch sections 311 and 312 becomes zero, so a system clock corresponding to the PCR value is regenerated.

As has been described above, according to the present invention, the transport packet arrival time is corrected on the basis of the addition average value of the system time clocks on the reception side at the detection timings of the starts of adjacent transport packets. With this arrangement, the AAL5 packing jitter, which is generated when MPEG data is transmitted through the ATM line, can be reduced.

In addition, for the corrected packet arrival time, the packing jitter is canceled. The arrival time is compared with the system time clock, and the transport packet in the latch means is P/S-converted and output when the comparison result represents coincidence. With this arrangement, the input data of transport packets which are time-compressed as burst data can be converted into predetermined bit rate data without using any PLL or buffer.

Furthermore, the frequency of the system clock is controlled using the PCR in the input data stream on the basis of the corrected packet arrival time. With this arrangement, the jitter characteristics of the system time clock on the reception side can be improved.

What is claimed is:

1. An AAL5 jitter reduction method for an image data transmission system for converting MPEG data into ATM cells and transmitting the ATM cells through an ATM line, comprising the steps of:

obtaining an addition average value of system time clocks at timings for detecting starts of adjacent transport packets after AAL5 termination; and correcting a transport packet arrival time on the basis of the obtained addition average value.

2. A method according to claim 1, further comprising the steps of latching the transport packets, comparing the corrected transport packet arrival time with the system time clock, and outputting the latched transport packets when a comparison result represents coincidence.

3. A method according to claim 1, wherein the correcting step comprises the step of adding a predetermined value to the obtained addition average value to correct the transport packet arrival time with reference to a time represented by the system time clock.

4. A method according to claim 3, wherein the predetermined value to be added to the addition average value is determined from a transport packet data interval on a transmission side and the obtained addition average value.

5. A method according to claim 1, further comprising the step of extracting a program clock reference (PCR) inserted into a stream, obtaining a difference value between the corrected transport packet arrival time and the extracted PCR, and controlling a frequency of the system time clock such that the difference value becomes zero.

6. An AAL5 jitter reduction apparatus comprising:

detection means for detecting a start of a transport packet;

a pair of first latch means for sequentially latching system time clocks of adjacent transport packets at detection timings of said detection means;

arithmetic means for adding a predetermined value to an addition average value of outputs from said latch means; and comparison means for comparing an output from said arithmetic means with the system time clock and controlling reception of the transport packet on the basis of a comparison result.

7. An apparatus according to claim 6, further comprising a pair of second latch means, connected to each other, for sequentially latching the received transport packets, and conversion means for, when a comparison result from said comparison means represents coincidence, parallel/serial-converting the transport packet output from a second stage of said second latch means and outputting the transport packet.

8. An apparatus according to claim 6, wherein the predetermined value to be added to the addition average value is determined from a transport packet data interval on a transmission side and the obtained addition average value.

9. An AAL5 jitter reduction apparatus comprising:

detection means for detecting a start of a transport packet;

a pair of first latch means for sequentially latching system time clocks of adjacent transport packets at detection timings of said detection means;

arithmetic means for adding a predetermined value to an addition average value of outputs from said latch means;

PCR extraction means for extracting a program clock reference (PCR) inserted into a stream and having time reference information; and difference calculation means for calculating a difference between the extracted PCR and an output from said arithmetic means after one transport packet time and controlling the system time clock on the basis of a calculation result.

10. An apparatus according to claim 9, wherein the predetermined value to be added to the addition average value is determined from a transport packet data interval on a transmission side and the obtained addition average value.

11. An apparatus according to claim 9, wherein said apparatus further comprising system clock means for counting a system clock on a reception side and outputting the system time clock to said latch means, and said difference calculation means controls a frequency of the system time clock in said system clock means on the basis of the calculation result.

* * * * *

UNITED STATES PATENT AND TRADEMARK OFFICE
CERTIFICATE OF CORRECTION

PATENT NO. : 6,339,597 B1
DATED : January 15, 2002
INVENTOR(S) : Bunri Osaki

Page 1 of 1

It is certified that error appears in the above-identified patent and that said Letters Patent is hereby corrected as shown below:

<u>Title page,</u>
Item [54] please change the title to -- [54] ALL5 JITTER REDUCTION METHOD AND APPARATUS --.
Please change the FOREIGN APPLICATION PRIORITY number to
-- [30] 9-210192 --.

Signed and Sealed this

Twenty-first Day of May, 2002

Attest:

Attesting Officer

JAMES E. ROGAN
Director of the United States Patent and Trademark Office